United States Patent
Kagan

(10) Patent No.: US 7,652,231 B2
(45) Date of Patent: Jan. 26, 2010

(54) APPARATUS FOR DELIVERING HARMONIC INDUCTIVE POWER

(75) Inventor: Valery Kagan, Colchester, VT (US)

(73) Assignee: iTherm Technologies, LP, Merrimack, NH (US)

( * ) Notice: Subject to any disclaimer, the term of this patent is extended or adjusted under 35 U.S.C. 154(b) by 278 days.

(21) Appl. No.: 11/868,034

(22) Filed: Oct. 5, 2007

(65) Prior Publication Data

US 2008/0238386 A1 Oct. 2, 2008

Related U.S. Application Data

(60) Division of application No. 11/264,780, filed on Nov. 1, 2005, now Pat. No. 7,279,665, which is a continuation-in-part of application No. 10/884,851, filed on Jul. 2, 2004, now Pat. No. 7,034,264, which is a continuation-in-part of application No. 10/612,272, filed on Jul. 2, 2003, now Pat. No. 7,034,263.

(51) Int. Cl.
H05B 6/04 (2006.01)
(52) U.S. Cl. ..................................... 219/663
(58) Field of Classification Search .............. 219/660, 219/661, 663, 665, 666
See application file for complete search history.

(56) References Cited

U.S. PATENT DOCUMENTS

| | | |
|---|---|---|
| 1,771,918 A | 7/1930 | Fry |
| 2,163,933 A | 7/1930 | Dufour |
| 3,436,642 A | 6/1938 | Segsworth |
| 3,436,641 A | 4/1969 | Biringer |
| 3,440,384 A | 4/1969 | Schroeder |
| 3,639,782 A | 2/1972 | Lord |
| 3,697,914 A | 10/1972 | Khrenov et al. |
| 3,708,645 A | 1/1973 | Osborn |

(Continued)

FOREIGN PATENT DOCUMENTS

GB 752268 7/1956

(Continued)

OTHER PUBLICATIONS

International Search Report mailed Dec. 13, 2004 in application PCT/US2004/021533.

(Continued)

Primary Examiner—Gary L Laxton
(74) Attorney, Agent, or Firm—Rissman, Hendricks & Oliverio, LLP

(57) ABSTRACT

Method and apparatus for providing harmonic inductive power, and more particularly for delivering current pulses providing a desired amount of pulse energy in high frequency harmonics to a load circuit for inductive heating of an article. By controlling the shape and/or frequency of such current pulses, the apparatus and method can be used to enhance the rate, intensity and/or power of inductive heating delivered by the heater coil and/or to enhance the lifetime or reduce the cost and complexity of an inductive heating power supply. Of particular significance, the apparatus and method may be used to significantly increase the power inductively delivered to a ferromagnetic or other inductively heated load, without requiring an increase of current in the heater coil. This enables new heating applications, and in some known applications, decreases the energy consumption or cooling requirements and/or increase the lifetime of the heater coil.

19 Claims, 5 Drawing Sheets

U.S. PATENT DOCUMENTS

| | | | |
|---|---|---|---|
| 4,017,701 A | | 4/1977 | Mittelmann |
| 4,025,864 A | | 5/1977 | Kennedy |
| 4,085,300 A | | 4/1978 | MacKenzie et al. |
| 4,151,387 A | | 4/1979 | Peters, Jr. |
| 4,207,451 A | | 6/1980 | Tudbury |
| 4,211,912 A | | 7/1980 | Kiuchi |
| 4,277,667 A | | 7/1981 | Kiuchi |
| 4,289,946 A | | 9/1981 | Yarwood et al. |
| 4,290,039 A | | 9/1981 | Tochizawa |
| 4,355,222 A | | 10/1982 | Geithman |
| 4,467,165 A | * | 8/1984 | Kiuchi et al. ............... 219/664 |
| 4,473,732 A | | 9/1984 | Payne |
| 4,589,059 A | | 5/1986 | Tanino |
| 4,798,926 A | | 1/1989 | Sakai |
| 4,814,567 A | | 3/1989 | DeAngelis |
| 5,053,593 A | | 10/1991 | Iguchi |
| 5,079,399 A | * | 1/1992 | Itoh et al. ................... 219/662 |
| 5,183,985 A | | 2/1993 | Sidky et al. |
| 5,216,215 A | | 6/1993 | Walker |
| 5,294,769 A | | 3/1994 | Nishi et al. |
| 5,331,127 A | | 7/1994 | Chen |
| 5,343,023 A | | 8/1994 | Geissler |
| 5,414,247 A | | 5/1995 | Geithman |
| 5,444,229 A | | 8/1995 | Rudolph |
| 5,450,305 A | | 9/1995 | Bys et al. |
| 4,733,342 A | | 3/1998 | Mueller |
| 5,789,721 A | * | 8/1998 | Hayashi et al. ............. 219/664 |
| 5,847,370 A | | 12/1998 | Sluka et al. |
| 5,854,473 A | | 12/1998 | Malnoe |
| 6,011,245 A | | 1/2000 | Bell |
| 6,043,635 A | | 3/2000 | Downey |
| 6,393,044 B1 | | 5/2002 | Fishman |
| 6,405,785 B1 | | 6/2002 | Gellert |
| 6,465,990 B2 | | 10/2002 | Acatrinei |
| 6,580,896 B2 | | 6/2003 | Lee |
| 6,608,291 B1 | | 8/2003 | Collins et al. |
| 6,630,650 B2 | | 10/2003 | Bassill et al. |
| 6,696,770 B2 | | 2/2004 | Nadot et al. |
| 6,717,118 B2 | | 4/2004 | Pilavdzic |
| 6,781,100 B2 | | 8/2004 | Pilavdzic |
| 6,992,406 B2 | | 1/2006 | Fishman et al. |
| 7,034,264 B2 | * | 4/2006 | Kagan ........................ 219/661 |
| 2003/0121908 A1 | | 7/2003 | Pilavdzic |
| 2005/0000959 A1 | | 1/2005 | Kagan |
| 2005/0006380 A1 | | 1/2005 | Kagan |

FOREIGN PATENT DOCUMENTS

| | | |
|---|---|---|
| GB | 772424 | 4/1957 |
| GB | 1380525 A2 | 1/1975 |
| JP | 02117088 A | 5/1990 |
| JP | 02117089 A | 5/1990 |
| JP | 2003-136559 A | 5/2003 |
| WO | WO03/001850 A1 | 1/2003 |

OTHER PUBLICATIONS

Stanley Zinn and S.L. Semiatin: "Coil design and fabrication: basic design and modifications," (pp. 32-36), Heat Treating, Jun. 1988.

Stanley Zinn and S.L. Semiatin: "Coil design and fabrication: part 2, specialty coils," (pp. 29-41), Heat Treating, Aug. 1988.

Stanley Zinn and S.L. Semiatin: "Coil design and fabrication: part 3, fabrication principles," (pp. 39-41), Heat Treating, Oct. 1988.

Induction Calender Profiler System Control Card Programmers' Manual, PCB version 1.0, Comaintel Inc., 2001.

Induction Calender Profiler System Operators' Manual, Comaintel Inc. 2001.

Watlow Press Release: Multi-Loop Controller is Offered with Adaptive Control (www.watlow.com, Dec. 5, 2005).

International Search Report and Written Opinion from corresponding international application PCT/US2006/042388 mailed Apr. 26, 2007.

European Search Report mailed Sep. 14, 2007 in European Application No. 06 07 06980.

* cited by examiner

APPARATUS FOR DELIVERING HARMONIC INDUCTIVE POWER

RELATED APPLICATIONS

This application is a divisional of U.S. Ser. No. 11/264,780, filed Nov. 1, 2005 entitled "Method and Apparatus for Providing Harmonic Inductive Power," which claims priority to U.S. Ser. No. 10/612,272, filed Jul. 2, 2003 entitled "Apparatus and Method for Inductive Heating" and U.S. Ser. No. 10/884,851, filed Jul. 2, 2004 entitled "Heating Systems and Methods", both by Valery Kagan, the subject matter of which are hereby incorporated by reference in their entirety.

FIELD OF THE INVENTION

The present invention is directed to a method and apparatus for providing harmonic inductive power, and in particular embodiments to a power supply and method of controlling the power supply to adjust the energy content of current pulses providing high frequency harmonics in an inductive heater coil.

BACKGROUND OF THE INVENTION

Traditional inductive heating systems utilize a resonant frequency power supply which delivers a sinusoidal current at a resonant frequency to the heater coil. In such systems, in order to increase the heating power delivered to the load, a large current must be delivered to the heater coil. There are numerous problems generated by the use of such large currents, including large power losses in the switching circuit, parasitic heating of the coil, the necessity for large tank capacitors (for tuning the resonance circuit), and the complexity of the control circuit. Most notably, such systems deliver to the load a sinusoidal resonant frequency current which signal is a continuous function of time.

It would be desirable to provide a power supply for an inductive heating system which is flexible and controllable to enable delivery of a desired rate of inductive heating and/or which is more efficient than the known inductive heating power supplies. Preferably, such a system would avoid one or more of the problems of complexity, failure, and cost of the prior known power supplies.

SUMMARY OF THE INVENTION

In one embodiment, the present invention provides a method of delivering inductive power from a power supply circuit to a load circuit for inductive heating of an article, wherein the power supply circuit includes a charging circuit coupled to the load circuit, the method including the steps of determining an impedance parameter of the load circuit, determining an impedance parameter of the charging circuit, and supplying to the load circuit, based on the determined impedance parameters of the load circuit and charging circuit, current pulses providing a desired amount of pulse energy in high frequency harmonics in the load circuit for inductive heating of the article. In one embodiment, at least 50% of the pulse energy is in high frequency harmonics, and more preferably, at least 90% of the pulse energy is in high frequency harmonics.

The power supply circuit preferably includes a switching device for control of the charging circuit. The method includes determining an on-time ($t_{on}$) of the switching device for providing the desired current pulses. The method further includes determining an off-time ($t_{off}$) of the switching device for providing the desired current pulses. Preferably, $t_{on}$ and $t_{off}$ are determined to enable delivery of a substantial portion (e.g., at least 50% and more preferably at least 90%) of the energy stored in the charging circuit to the load circuit. Still more preferably, $t_{on}$ and $t_{off}$ enable delivery of substantially all of the energy stored in the charging circuit to the load circuit.

The current pulse signal in the load circuit will depend on the resistive component of the load, which dampens the current pulse signal. Generally, a higher damping ratio, associated with a higher eddy current resistance in the load, is desired to achieve a high inductive heating power and, in the present invention, a lower current in the heater coil ($P=I^2R$). One of the advantages of the invention is the ability to drive (power) such highly damped loads, i.e. with a current pulse having high frequency harmonics, as opposed to the resonant sinusoidal signal typically used for inductive heating. In various embodiments, the load circuit has a damping ratio in the range of 0.01 to 0.2, and more preferably 0.05 to 0.1. This damping ratio may produce about 3 or 2 oscillations per pulse respectively before opening the switch.

In other embodiments, the method may be intermittently employed, during a cycle of heating the article, to detect changes in at least one of the determined impedance parameters. In another embodiment, the method includes modifying an impedance parameter of the charging circuit based on a desired power delivery to the load circuit.

In yet another embodiment, a method includes providing a power supply circuit for delivering current pulses with high frequency harmonics in a load circuit for inductive heating of an article. Prior to the delivery of the current pulses, an impedance parameter of the load circuit is determined (e.g., by providing a test pulse and monitoring the response) and an energy content of the current pulses is determined based upon the determined impedance parameter. The method may further include monitoring the response of the load circuit for changes to the determined impedance parameter. The method may further include determining the energy content of the current pulses based upon one or more limitations of the power supply circuit, including limitations of voltage, current spike, RMS current, switching frequency and temperature. Furthermore, the monitoring may be used to detect a presence, absence or change in: an input to the power supply; a connection of the load circuit to the power supply; a failure of a heater coil in the load circuit; a loss or change of magnetic coupling during heating of the article; and contact between one or more turns of the heater coil.

In accordance with another embodiment of the invention, a method is provided for inductive heating of a load circuit having variable impedance parameters. For example, for a given load, the resistance, capacitance and/or inductance may all vary with temperature. The method includes the steps of providing a signal to determine one or more impedance parameters of the load circuit and supplying to the load circuit current pulses providing high frequency harmonics in the load circuit based on the determined one or more impedance parameters. The load circuit includes a heater coil generating a magnetic flux for inductive heating of an article. The variable impedance parameters of the load circuit may also be based on one or more of variations in the heater coil and variations in magnetic coupling between the heater coil and the article.

In a still further embodiment, a method of dynamic heating control is provided including the steps of supplying current pulses providing a desired amount of pulse energy in high frequency harmonics in a load circuit for inductive heating of an article, supplying a signal for determining one or more impedance parameters of the load circuit during heating, and modifying the energy content of the current pulses based upon the determined one or more impedance parameters. In addition, the energy content of the signal may be modified (where each pulse has the same energy content) by modifying the frequency (number of pulses per unit of time) of the signal, e.g., increasing the power delivered to the load by increasing the frequency of pulses (and thus energy content) of the signal.

In a further method embodiment, the steps include supplying current pulses with high frequency harmonics in a load circuit for inductive heating of an article, determining one or more impedance parameters of the load circuit and determining an energy content of the current pulses based on the one or more impedance parameters and a desired power delivery to the load circuit.

In a further embodiment, a method is provided of delivering inductive power from a power supply circuit to a load circuit coupled to the power supply circuit. The method includes supplying current pulses with high frequency harmonics in the load circuit for inductive heating of an article, determining one or more limitations of the power supply circuit, determining one or more impedance parameters of the load circuit, and determining, based on the one or more determined impedance parameters and limitations, an energy content of the current pulses for delivery of a desired power to the load circuit within the limitations of the power supply circuit. The power supply circuit may include a charging circuit coupled to the load circuit, wherein the method includes determining an impedance of the charging circuit based on a frequency response of the charging circuit. The method may further include determining an impedance of the load circuit based on a frequency of oscillation of the load circuit. The frequency of oscillation may be determined by monitoring consecutive zero crossings of a voltage or current supplied to the load circuit. In addition, the power delivered to the load circuit will depend on the damping coefficient. The damping coefficient may be determined by monitoring the amplitude of consecutive peaks of a voltage or current supplied to the load circuit.

In accordance with another embodiment of the invention, a power supply control apparatus is provided which includes a charging circuit, and a load circuit coupled to the charging circuit. A switching device controls the charging circuit to deliver current pulses in the load circuit during an on-time of the switching device, and a monitoring and control circuit controls the on-time and off-time of the switching device during a heating cycle to provide a desired amount of pulse energy in high frequency harmonics in the load circuit.

In various embodiments, the monitoring and control circuit controls an opening time of the switch device by monitoring current in the charging and load circuits. The desired amount of pulse energy in high frequency harmonics may be at least 50 percent. The switching device may couple the charging circuit and load circuit so that at least 50 percent (and more preferably at least 90 percent) of the energy stored in the charging circuit is delivered to the load circuit. The switching device may couple the charging circuit to the load circuit so that for an input voltage $U_D$ to the charging circuit, a voltage of at least $2 U_D$ is delivered to the load circuit. The switching device may couple the charging circuit to the load circuit such that the current oscillates through the switching device during the delivery of the current pulses to the load circuit. The switching device may also couple the charging circuit to the load circuit such that energy is left stored in the charging circuit to achieve a non-zero current condition in the load circuit on subsequent charging cycles. The on-time and/or off-time may be controlled to achieve a substantially zero current condition through the switch, while neither the load circuit nor the charging circuit has a zero current condition. The monitoring circuit may include means for monitoring consecutive zero crosses of the current or voltage in the current pulse and determining a desired shape and frequency of the current pulse based on such monitoring. The switching device may comprise a plurality of switches disposed in parallel. The apparatus may also include means for preventing current in the load circuit from flowing back through the charging circuit.

In various embodiments, the load circuit has a damping ratio in the range of 0.01 to 0.2, and more preferably in the range of 0.05 to 0.1. The apparatus may include a signal generator to provide a signal in the load circuit to determine at least one impedance parameter of the load, and/or monitor a response of the load circuit due to changes in the impedance parameter. The load circuit may include a heater coil magnetically coupled to a ferromagnetic or conductive article. The apparatus may include means for monitoring one or more of a zero crossing of voltage or current supplied to the load circuit, and/or amplitudes of consecutive peaks of voltage or current in the load circuit.

In another embodiment, a method is provided for generating current pulses which provide a desired amount of pulse energy in high frequency harmonics in the load circuit for inductive heating of an article. The method includes generating current pulses with high frequency harmonics, each pulse comprising at least one steeply varying portion for delivering at least 50% of the pulse energy in the load circuit in high frequency harmonics. The method further includes controlling the on/off timing of the current pulses to generate a plurality of such pulses as a desired current signal for inductive heating. In various embodiments, the on/off timing may be controlled to produce two or three oscillations in each current pulse. The on/off time may further be controlled such that each current pulse ends after its amplitude falls by at least 50% from an amplitude of a maximum peak in the current pulse. Alternatively, the current pulse may end after its amplitude falls by at least 75%, by at least 90%, or by at least 95%.

In select embodiments, the on/off timing may be controlled so that each current pulse includes at least one steeply varying portion having a maximum rate of change at least five times greater than the maximum rate of change of a sinusoidal signal of the same fundamental frequency and RMS current amplitude. The maximum rate of change may be at least ten times greater, or at least twenty times greater. An upper limit of the maximum rate of change may be determined by a voltage limit in the load circuit. Still further, the on/off time may be controlled so that each current pulse contains at least two complete oscillation cycles before damping to a level below 10% of an amplitude of a maximum peak in the current pulse.

These and other features of the present invention will be more particularly understood with regard to the following detailed description and drawings.

BRIEF DESCRIPTION OF THE DRAWINGS

Various embodiments of the invention may be better understood by referring to the following description in conjunction with the accompanying drawings in which:

FIG. 1 is a schematic diagram of an inductive heating apparatus according to one embodiment of the invention; the apparatus includes a power supply circuit and a load circuit.

DETAILED DESCRIPTION

Figure 1A:
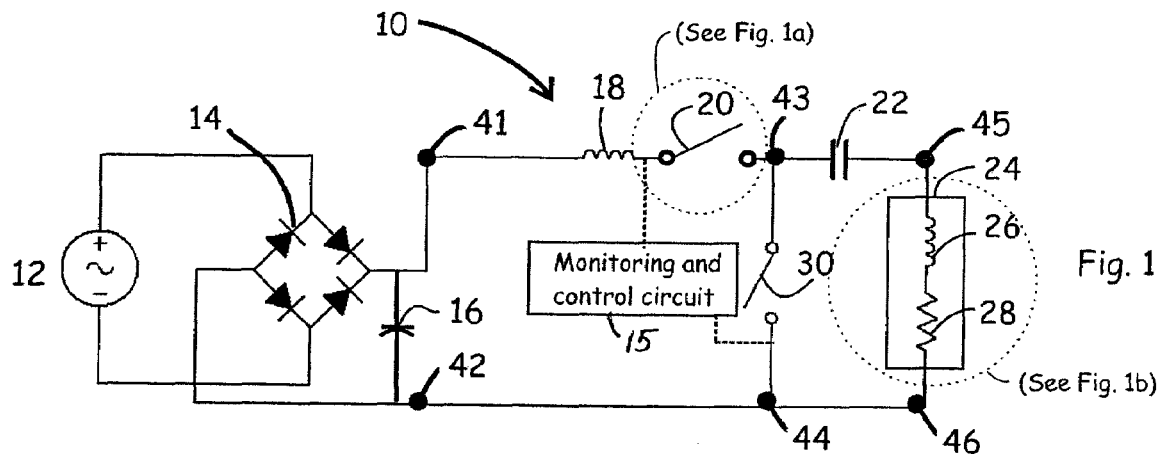
FIGS. 1a and 1b are enlarged partial views, FIG. 1a illustrating a diode which may be provided in place of switch 20, and FIG. 1b illustrating the components of a load.

It has been determined that current pulses of a certain profile can be used to enhance the rate, intensity and/or power of inductive heating delivered by a heating element (herein referred to as a heater coil) and/or to enhance the lifetime or reduce the cost and complexity of an inductive heating system. This may be accomplished, in select embodiments, without requiring a corresponding increase of current in the heater coil. It may enable, in various embodiments, use of a lower fundamental frequency (while maintaining a desired level of power delivered to the load) and may be coupled with structural heating and cooling elements that enable directed (localized) heating and cooling effects for producing tighter temperature control, higher power densities and/or a reduced cycle time.

More specifically, these current pulses, referred to herein as current pulses providing high frequency harmonics, have a rapidly changing current profile which enhances the inductive heating performance. The current pulses are generally characterized as discrete narrow width pulses, separated by relatively long delays, wherein the pulses contain one or more steeply varying portions (large first derivatives) which provide harmonics of a fundamental (or root) frequency of the current in the coil. The provision of such pulses in the heater coil may be used to significantly increase the power inductively delivered to a ferromagnetic or other inductively heated load, without requiring an increase of the Root Mean Square (RMS) current in the coil. This may enable new heating applications and, in some known applications, may decrease the energy consumption or cooling requirements and/or increase the lifetime of the heater coil.

One problem that may be addressed by use of these current pulses, alone or coupled with the structural heating and cooling elements described herein, is a desire to increase the inductive heating power while staying within the maximum tolerable or limit RMS current ($I_{c\text{-}limit}$) which a given heater coil can withstand and still provide a useful lifetime. Thus, for given values of $I_{c\text{-}limit}$, the number of coil turns N, and the coefficient of electromagnetic connection $K_c$, these current pulses can be used to increase the inductive heating power.

Furthermore, unlike prior art inductive heating systems, these pulses may be utilized with a load of high equivalent resistance ($R_{eq}$), e.g., $$R_{eq} \gg 2\sqrt{\frac{L_L}{C_L}}$$

where $L_L$ is the inductance of the load circuit and $C_L$ is the capacitance of the load circuit.

Proposed prior art solutions to the problems caused by the heater coil current limit include: increasing the resonant frequency of the power supply; decreasing the resistance of the coil; and/or increasing cooling of the heater coil (the later requiring thermal isolation of the cooled coil from the heated article). If the resonant frequency is increased, special capacitors are provided in parallel with the coil as a "resonant converter" to adjust (tightly control) the resonant frequency of the sinusoidal current supplied to the heater coil. One problem with this solution is that the power supply is not adapted to work with a resistive load (resistive coil and/or high eddy current resistance in the load). Other disadvantages of this approach are the high cost of the amplifiers used in these high power, high frequency resonant converters.

In prior art inductive heating systems, harmonics are generally disfavored, and consequently comprise an insignificant (minimized) portion of any current signal supplied in a resonant heating system. This is consistent with a general disfavor of high frequency harmonics in all power electronics because they can be difficult to produce, difficult to control, and may produce undesired side effects. For these reasons, electrical utility companies utilize filter capacitors to rid their power delivery systems of harmonics because their customers do not want to see harmonics, referred to as noise, interfering with their electrical equipment.

In contrast here current pulses are deliberately provided with harmonics above the root frequency of the coil current. These discrete narrow width current pulses contain steep slopes (changes in amplitude) and relatively long delays are provided between pulses. They may appear as chopped or oscillating pulses, with a relatively large delay between pulses.

The harmonics provide an increase in the effective heating frequency of the current pulse signal, particularly where the amplitudes of the harmonics are kept high so that the inductive heating power is high. Viewed with a spectrum analyzer, the current pulses include multiple frequency components. The amplitudes of all harmonics may be enhanced, for example, by selecting appropriate input voltages to the load circuit, and/or the amplitude of select harmonics can be enhanced by changing the shape of the current pulses.

Various implementations of the invention are described below, following a general description of various design factors on which such implementations may depend.

The desired current pulses with high frequency harmonics can be generated by a variety of electronic devices which provide rapid switching to produce much of the pulse energy in high frequency harmonics. The use of multi-phase devices can further be used to boost the fundamental frequency of the pulses.

A number of problems may arise with respect to implementing a power supply for delivering current pulse signals with high frequency harmonics. One source of difficulty derives from the characteristics of the current pulse signal itself. The high energy content of individual pulses may cause excessively high levels of voltage and/or current in select portions of the power supply and/or load circuits. Therefore, limitations in one or more of the: voltage, current, rate of change (in voltage or current), frequency, and/or temperature, which are tolerated by the components of the supply and/or load circuits, should be recognized and not exceeded.

A second source of difficulty may arise because the pulses contain steeply varying portions, making it difficult to initiate and/or end such a pulse at a particular current level, such as a zero crossing. As a result, the switching device for driving the power supply circuit should preferably be able to monitor and control non-zero conditions emanating from a prior cycle (of pulse creation). These non-zero initial conditions lead to potentially damaging levels of current or voltage which can destroy (or reduce the lifetime) of one or more components of the power supply circuit and/or the load circuit.

A further difficulty is that the power delivery to the load circuit, which depends upon both the energy content of the individual current pulses and the off time ($t_{off}$) between pulses, will vary depending upon the damping characteristic of the load circuit. The damping characteristic determines how much energy is dissipated in the load circuit when alternating current flows through the heating coil, and may be unknown. Further unknown factors are dynamic changes which may occur during the heating process itself, wherein the characteristics of the load circuit and/or power supply may vary depending upon the temperature, rate, and/or intensity of heating.

Within these constraints, it would be desirable to provide current pulses with high frequency harmonics that can deliver a variable level of power in order to vary the rate and/or intensity of inductive heating of an article in the load circuit. It would also be desirable to control, on a dynamic basis, including while the load circuit is being used to inductively heat an article, the power delivery to the load. It would also be desirable to provide a power supply that can drive different load circuits, including heater coils with different characteristics (e.g., different materials, number of turns, coil configuration, wire diameter, etc.), as well as loads with different characteristics of magnetic coupling between the heater coil and heated article. It would also be desirable to optimize (maximize) the heating power delivered to a load for a given set of limitations, namely the characteristics of the components of the power supply circuit and/or load circuit. And further, it would be desirable to provide a power supply that can identify and/or verify the characteristics of the power supply components and/or load characteristics prior to or during use (heating of the article) in order to avoid exceeding the limitations of one or more components of the power supply and/or load circuits. These identification and/or verification steps may include, for example, identifying or verifying: the characteristics of the load; the characteristics of the input signal to the power supply; whether the heater coil is properly attached to the power supply; whether the heater coil has failed; whether the inductive coupling has been lost or changed during heating (e.g., the load being heated above the Curie point (changing permeability), or a touching (contact) of adjacent turns of the heater coil thereby changing the inductance of the load circuit). One or more of these goals is achieved by various embodiments of the power supply apparatus and methods described herein.

Delivering current pulses that contain large amounts (e.g., at least 50%) of high frequency harmonics to a load is limited by several fundamental constraints. The most restrictive is the need for surges in current (rapidly changing amplitudes), and the correspondingly high peaks in voltage required to produce such current surges. Because heating power is equal to the product of RMS current and RMS voltage (when there is no phase shift between the two), it is desirable to keep the RMS voltage high. When pulses are created that have shorter durations and steeper edges, they generally have higher amounts of high frequency harmonics; however, as pulse duration decreases, the pulses must increase in amplitude to maintain high amounts of power. This increase in amplitude is limiting for two reasons: high voltage must be created, and the high voltage must be controlled.

Figure 1A:
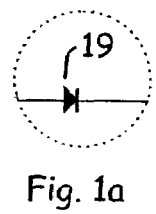

To create a high voltage, one of several methods may be employed. With reference to FIG. 1, in one method an input potential $U_D$ is applied across terminal pair 41-42. With switch 20 closed and switch 30 open, current flows through series LC circuit formed by inductor 18 and capacitor 22, and capacitor 22 is charged to twice the input voltage $2 U_D$ (see FIG. 4). Once fully charged, switch 30 is closed and substantially all of the energy in capacitor 22 is delivered to the load 24. Following such delivery, switch 30 is then opened for the next charging cycle. Delivering twice the input voltage to the load enables one to decrease the pulse width and/or increase the percentage of high frequency harmonics in the current pulses, while maintaining a given power delivery to the load. In other embodiments, the capacitor 22 may be charged to a value of greater than $2 U_D$.

In one method for charging capacitor 22 to greater than $2 U_D$, switch 20 and 30 are closed at the same time, whereby current will surge linearly through inductor 18, switch 20 and switch 30. The rate of current increase (dI/dt) will be a function of $U_D$ (the potential across 41-42) and $L_{ch}$ (the inductance of the charging circuit). There is no significant charging of capacitor 22 at this time, but energy is stored in inductor 18. When switch 30 is then opened, the energy stored in the magnetic field of inductor 18 ($\frac{1}{2} LI^2$) will charge the capacitor 22 (to a potential energy of $\frac{1}{2} CV^2$), minus any losses in the system. One can attain a very high voltage across the capacitor, greater than $2 U_D$. When switch 30 is then closed, the energy in capacitor 22 is delivered to the load. Care must be taken in selecting when to open switch 30 (i.e., based on C and I and the voltage limits of capacitor 22 and switch 30), because of the potential for failure of switch 30 due to the voltage spike developed across switch 30 when it is opened.

A second method for charging capacitor 22 to greater than $2 U_D$, employs several charging cycles. In a first charging cycle (starting with zero energy in both inductor 18 and capacitor 22), switch 20 is closed and switch 30 is open and capacitor 22 is charged to less than $2 U_D$, leaving some energy stored in the magnetic field of the inductor 18. When switch 30 is then closed, current surges linearly through inductor 18, switch 20 and switch 30 delivering the energy stored in capacitor 22 to the load 24. While switches 20 and 30 are closed, current oscillates from capacitor 22 through switch 30 and inductor 26 of load 24 (counterclockwise), and then reverses and flows (clockwise) from capacitor 22 through inductor 26 and back through switch 30 (see e.g. FIGS. 3a and 3b). The opening of switch 30 may now be timed such that the current flowing "up" through 30 due to the oscillation of the load circuit, and the current flowing "down" through 30 due to the linearly increasing current through inductor 18, sufficiently cancel one another. There will then be substantially no current through switch 30, allowing safe opening of the switch, and maintaining some energy stored in the magnetic field of inductor 18 for subsequent charging of the capacitor. This is referred to as "non-zero" initial conditions, and allows the capacitor 22 to eventually be charged, over a series of cycles, to a value of greater than $2 U_D$ (see FIG. 8, described in a subsequent section on operation within the voltage limits of the switch). The magnetic field of inductor 18 grows with each cycle until an equilibrium is reached, wherein there is substantially no change in energy storage from one cycle to the next (in other words, at the end of each cycle, the energy stored in inductor 18 and capacitor 22, and thus delivered to the load 24, is constant from pulse to pulse). This equilibrium takes several cycles to reach, starting from a zero initial condition in the inductor 18 and capacitor 22. A further advantage of this embodiment is the ability to open the switch 30 without the potential for exceeding the voltage limit of the switch (due to the low level of current in the switch at opening.)

The operation of the switching circuits of FIGS. 1-3 will be further discussed below in a more specific embodiment.

To control the high voltage potential and corresponding surges in current, and to provide a high switching speed, an insulated gate bi-polar transistor (IGBT) may be used (as switch 30 in FIG. 1). IGBTs are commercially available at various voltage and current ratings, and may be selected for a particular implementation. In other embodiments, a plurality of smaller IGBTs in parallel can be used to drive the load, instead of a single larger IGBT. This may decrease the cost of the switching component of the power supply circuit, particularly as the desired power level increases. Utilizing a plurality of smaller IGBTs enables one to increase the frequency of the signal (number of pulses per unit time) and thus increase the power, while not exceeding the current limit of the switch.

It is desirable to create an oscillating current pulse (non-constant sign) because it can have higher amounts of high frequency harmonics than a constant sign pulse. In order to create an oscillating current pulse, a bi-polar charging capacitor 22 may be used. The charge on this capacitor is released (discharged) through the load several times from alternating sides within the duration of the pulse. During discharge, because the IGBT switch 30 only allows current to flow from the collector to the emitter (see FIG. 3a) and current $I_L$ is flowing in both directions, the switching circuit must be designed to accommodate this two-directional flow. One design is to provide a diode 33 in parallel with the switch 30 that allows current to flow back around the switch (see FIG. 3a).

As one skilled in the art will recognize, an isolated load circuit will not oscillate with only a charged capacitor and a resistive load (or a load that is critically, or more, damped)—some inductance within the heating coil is desirable to create an oscillating pulse. The heating coil is thus an important part of the load circuit and together with the charging capacitor, will determine the shape of the current pulses in particular embodiments.

The shape of the current pulse signal delivered to the heating coil determines the relative amount of each high frequency harmonic, while the combination of shape and amplitude of the signal determines the energy content. The desired shape of the signal will depend on the load parameters, which are unknown and dynamic in many cases. In the following example, one or more of the load parameters will first be identified and then utilized to determine a desired signal shape. As used in this example, the signal shape describes both the duty cycle (ratio of on-time to off-time) and the shape of the wave within the pulse (during the on-time).

Select embodiments will now be described illustrating various aspects of the invention.

FIG. 1 is a schematic diagram of a network 10 which includes a power supply circuit (on the left hand side) connected to a load circuit (on the right hand side). The network comprises an interconnection of network elements, the elements comprising models of physical components or devices. The network may be partitioned into several sub-networks, including the charging sub-network illustrated in FIG. 2, and the load sub-network illustrated in FIG. 3.

A voltage source 12 provides (for example) an input AC signal of 115V at line frequency (60 HZ) to a bridge circuit 14. The bridge 14 is disposed in parallel with a filter capacitor 16, providing a DC potential $U_D$ at terminal pair 41-42. This DC input (supply) voltage $U_D$ causes a current $I_{ch}$ to flow in the charging circuit, as illustrated in FIG. 2. A monitoring and control circuit controls the switches 20 and 30 and monitors the current and/or voltage in the charging and load circuits.

The charging sub-network is enabled by closing switch 20 and opening switch 30, creating a series LC circuit between terminal pair 41-42. Inductor 18 allows DC current to flow through and charge the series capacitor 22. The energy stored in capacitor 22 (as an electric field) will later be used to deliver power to the load circuit of FIG. 3. The load 24 is not shown in FIG. 2, for ease of illustration, because the inductance of inductor 18 $L_{ch}$ is selected to be much greater than the inductance of the load 26 $L_L$, so that the load does not have a significant effect on the charging circuit. In other examples, where this selection is not made, the inductances of both the inductor 18 and load 26 would be considered in determining the response (e.g., charging time) of the charging circuit.

Figure 4:
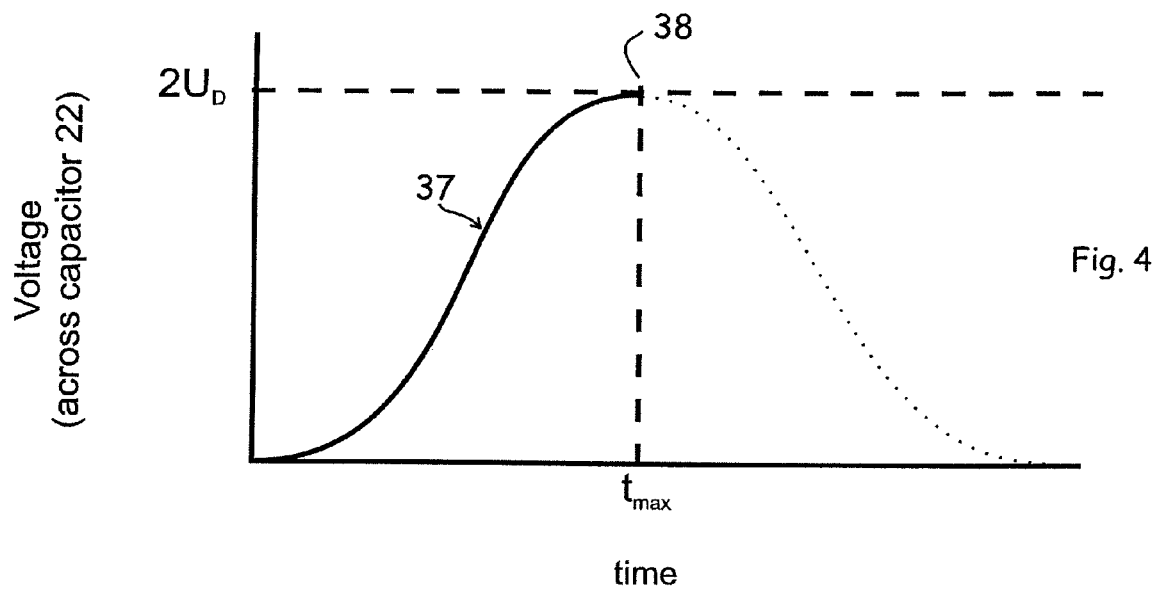
FIG. 4 is a schematic diagram of voltage across a charging capacitor as a function of time, in one embodiment.

As illustrated in FIG. 4, during charging of capacitor 22 the voltage across terminal pair 43-44 increases. In this embodiment, the voltage across charging capacitor 22 is allowed to substantially approach a maximum potential 2 $U_D$ which is shown in FIG. 4 as point 38 at time $t_{max}$. As previously described, 2 $U_D$ may be the maximum if the opening of switch 30 is limited to "zero current" initial conditions. In other embodiments, as previously described, a higher voltage potential can be achieved under "non-zero" initial conditions.

Figure 3:
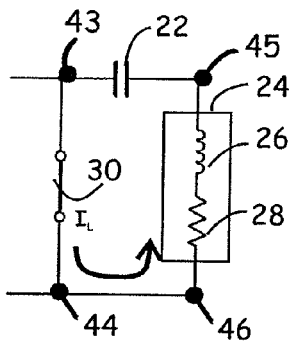
FIG. 3 is a schematic diagram of a load circuit portion of the apparatus of FIG. 1.
Figure 3A:
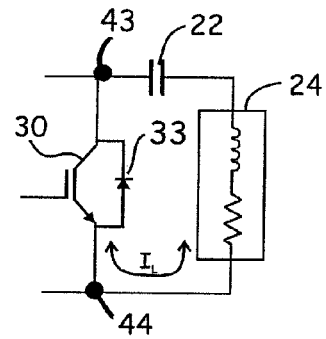
FIGS. 3a and 3b illustrate alternative switch embodiments in the load circuit.
Figure 3B:
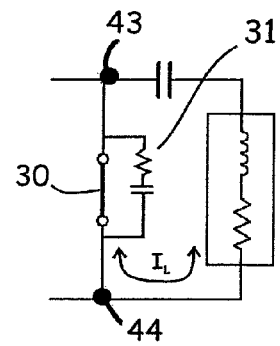
Figure 5:
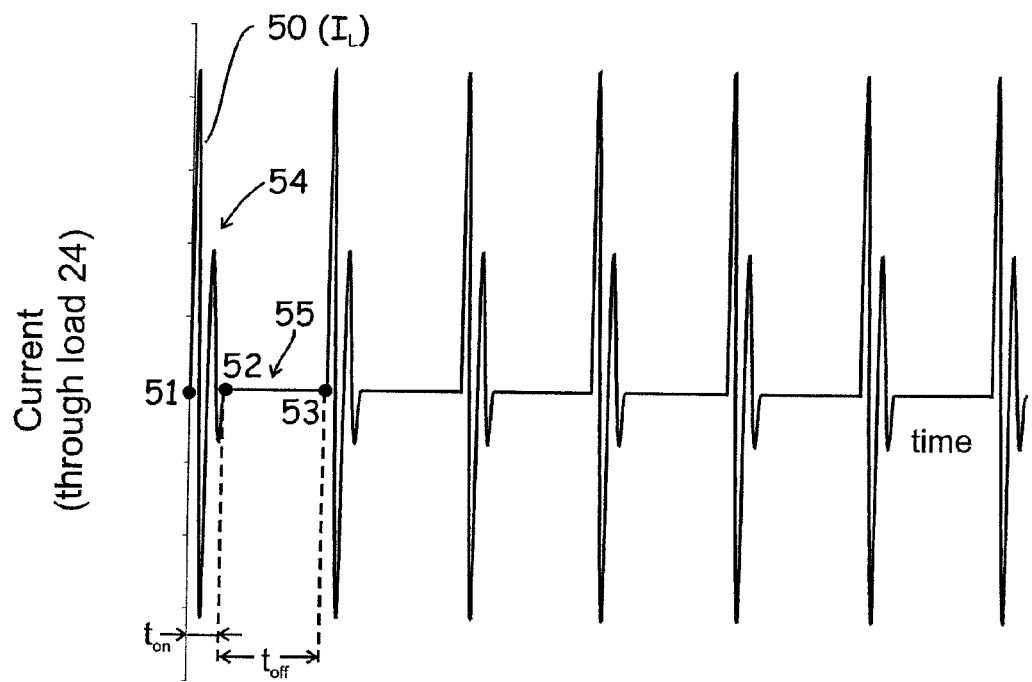
FIG. 5 is a schematic diagram of current through the load as a function of time, illustrating a plurality of current pulses providing high frequency harmonics in the load circuit according to one embodiment.
Figure 6:
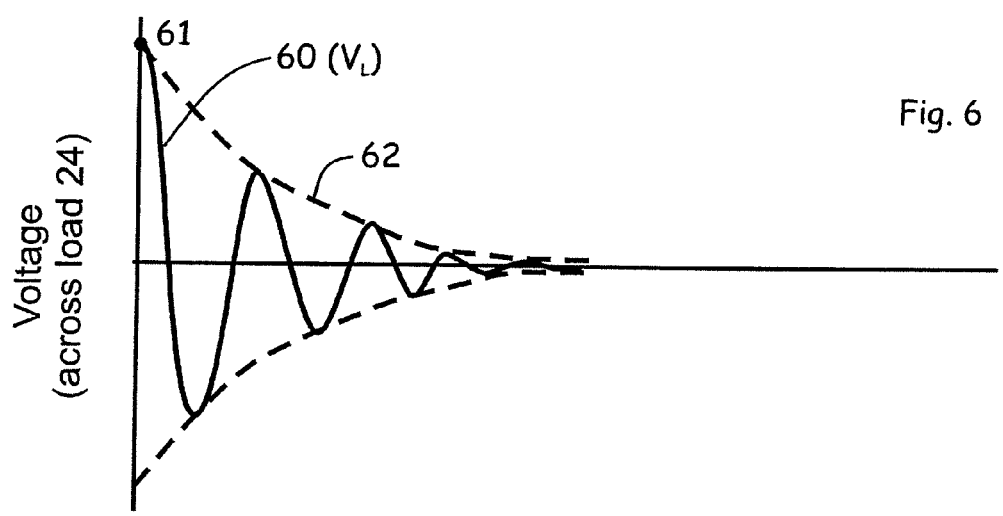
FIG. 6 is a schematic diagram of voltage across the load as a function of time, illustrating the shape of a single pulse in one embodiment.
Figure 7:
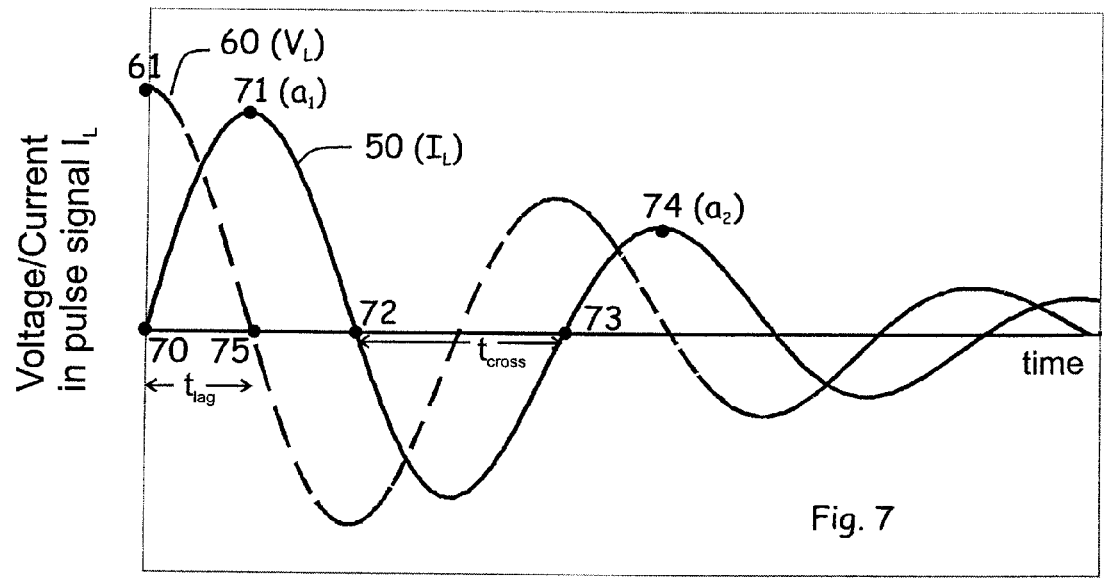
FIG. 7 is a schematic diagram of voltage and current in a pulse delivered to the load, in one embodiment.

With a maximum potential 2 $U_D$ produced across terminal pair 43-44, switch 30 is now closed, as illustrated in FIG. 3, allowing the energy stored in capacitor 22 to be delivered (discharged) to the load 24. The power delivery circuit of FIG. 3 is a series RLC circuit in which current $I_L$ is delivered to the load 24. The load includes both an inductive component 26 and a resistive component 28. The current $I_L$ in the heater coil comprises current pulses with high frequency harmonics, as illustrated in FIG. 5. During the time that switch 30 is closed, referred to herein as a (switching) on-time $t_{on}$ the current pulse is delivered to the load (heater coil). The resistive component 28 of the load dampens the oscillating current pulse. This is best shown in FIGS. 6-7, where the damping of a single pulse is shown to cause a successive decrease in amplitude of the pulse over time. Once the amplitude is substantially diminished, the switch 30 is opened (start of off-time $t_{off}$) and a new charging cycle begins for generating the next pulse.

As previously discussed, it is desirable in various embodiments of the invention to maximize the power delivery to the load without exceeding the limitations and/or substantially diminishing the lifetimes of the power supply and/or load circuit components. Various examples of such methods will now be described.

Determining the Inductance of the Charging Circuit

Figure 2:
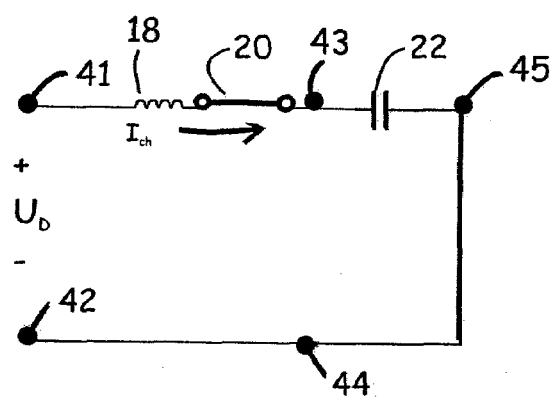
FIG. 2 is a schematic diagram of a charging circuit portion of the apparatus of FIG. 1.

The charging circuit of FIG. 2 has a frequency $f_{ch}$ which can be measured for determining (when the capacitance of capacitor 22 is known) the inductance of the charging circuit (which includes the inductances of inductor 18 and load 26). The measured time $t_{max}$ for the charging capacitor 22 to reach a maximum voltage 38 (see FIG. 4) can be used to calculate the frequency of the charging circuit from Equation 1.0:

$$f_{ch} = \frac{1}{2t_{max}} \quad (1.0)$$

Knowing $f_{ch}$ and the capacitance C of charging capacitor 22, the inductance of the charging circuit $L_{ch}$ can be calculated from Equation 1.1:

$$L_{ch} = \frac{t_{max}^2}{\pi^2 C} \quad (1.1)$$

The inductance of the charging circuit will later be used to determine a desired current signal function and a desired off-time for the switch 30.

Determining the Inductance of the Load Circuit

The load circuit of FIG. 3 has a frequency $f_L$ which can be determined by measuring the time $t_{cross}$ between two consecutive zero crossings of the current $I_L$ (see e.g., points 72 and 73 in FIG. 7) and using Equation 2.0:

$$f_L = \frac{1}{2t_{cross}} \quad (2.0)$$

where $\omega_L = 2\pi f_L$ is the corresponding angular frequency of the load circuit.

Knowing $f_L$ and the capacitance C of the charging capacitor 22, the inductance of the load circuit $L_L$ can be calculated from Equation 2.1:

$$L_L = \frac{1}{C(2\pi f_L)^2} \quad (2.1)$$

The inductance of the load circuit will later be used to determine desired values of on-time and off-time for the switch 30.

Determining the Resonant Resistance of the Load Circuit

The series RLC load circuit of FIG. 3 has a resonant resistance, referred to herein as $R_L^0$, which can be calculated using equation 3.1 (by knowing the inductance of the load circuit $L_L$ and the capacitance C of charging capacitor 22):

$$R_L^O = \sqrt{\frac{L_L}{C}} \quad (3.1)$$

The load circuit also has an angular resonant frequency $\omega_o$ which can be determined using Equation 3.2:

$$\omega_O = \sqrt{\frac{1}{L_L C}} \quad (3.2)$$

The resonant resistance and angular frequency of the load circuit will later be used to determine a desired current signal function and an optimum value of on-time $t_{on}$ for the switch 30.

Determining the Damping Ratio

In a series RLC circuit such as FIG. 3, the resistive component 28 dampens the current pulse signal $I_L$ as illustrated in FIGS. 5-7. A damping ratio, denoted by the Greek letter zeta, can be determined by measuring the amplitudes of two consecutive current peaks $\alpha_1$, $\alpha_2$ (e.g., points 71 and 74 in FIG. 7) and using Equation 4.1:

$$\zeta = \frac{-\ln\left(\frac{a_2}{a_1}\right)}{2\pi} \quad (4.1)$$

Alternatively, one can determine the damping ratio by measuring the amplitudes of two consecutive voltage peaks.

The damping ratio is later used for selecting a desired current signal function.

Determining the Load Current

The relationship between voltage 60 and current 50 of a damped non-constant sign current pulse signal $I_L$, with respect to time, is shown in FIG. 7. The current $I_L$ in the primarily inductive load network of FIG. 3 lags the voltage by a time $t_{lag}$, shown in FIG. 7 as the time between two successive zero crossings (points 70 and 75) of the voltage 60 and current 50. This phase difference will affect the power delivery, as described in a subsequent section on maximizing power delivery.

A high initial voltage 61 is desirable for obtaining a high amplitude current signal 50 and, as a result, a high heating power. FIG. 6 illustrates a damped oscillating voltage signal 60 within envelope 62, showing the rate of change of the voltage amplitude in the current pulse delivered to the load.

The shape of the current pulse signal $I_L$ in the load circuit, given the parameters of the network elements of the present embodiment, can be determined using Equation 4.2:

$$I(t) = \frac{U}{R_L^0 \sqrt{1-\zeta^2}} e^{-\zeta \omega_L t} \sin\left(\omega_0 \sqrt{1-\zeta^2}\right)t \quad (4.2)$$

where U is the initial voltage across the load (point 61 in FIGS. 6-7), $R_L^O$ is the resonant resistance of the load circuit as previously determined in Equation 3.1, $\zeta$ is the damping ratio of the load circuit as previously determined in Equation 4.1, $\omega_0$) is the resonant angular frequency of the load circuit as determined in Equation 3.2, and $\omega_L$ is the resonant frequency of the load circuit as determined from $f_L$ in Equation 2.0.

This current function I(t) can then be used to calculate a desired pulse duration (on-time of switch 30) for discharge of capacitor 22 and a desired safe time (e.g. low current) for opening the switch 30.

Operating within the Voltage Limits of the Power Supply Switch

As previously discussed, switch 30 is one of the power supply components having one or more limitations that should not be exceeded. In this example, a desired current pulse signal is determined which will avoid exceeding the voltage limit of the switch 30.

Switch 30 has a voltage limit $U_{max}$ which may be exceeded depending upon the voltage limit of the capacitor 22 and/or the total current flowing through the switch 30, where the total current may include components from both the load and charging circuits $I_L$ and $I_{Ch}$.

It is generally desirable to close switch 30 (start of on-time) when the current $I_{ch}$ in the charging circuit is low. This is one reason to avoid charging capacitor 22 beyond the desired maximum voltage (38 in FIG. 4). If the charging current through inductor 18 exceeds the current limit of this inductor, the switch 30 may be exposed to an excessive current when it is closed.

Figure 8:
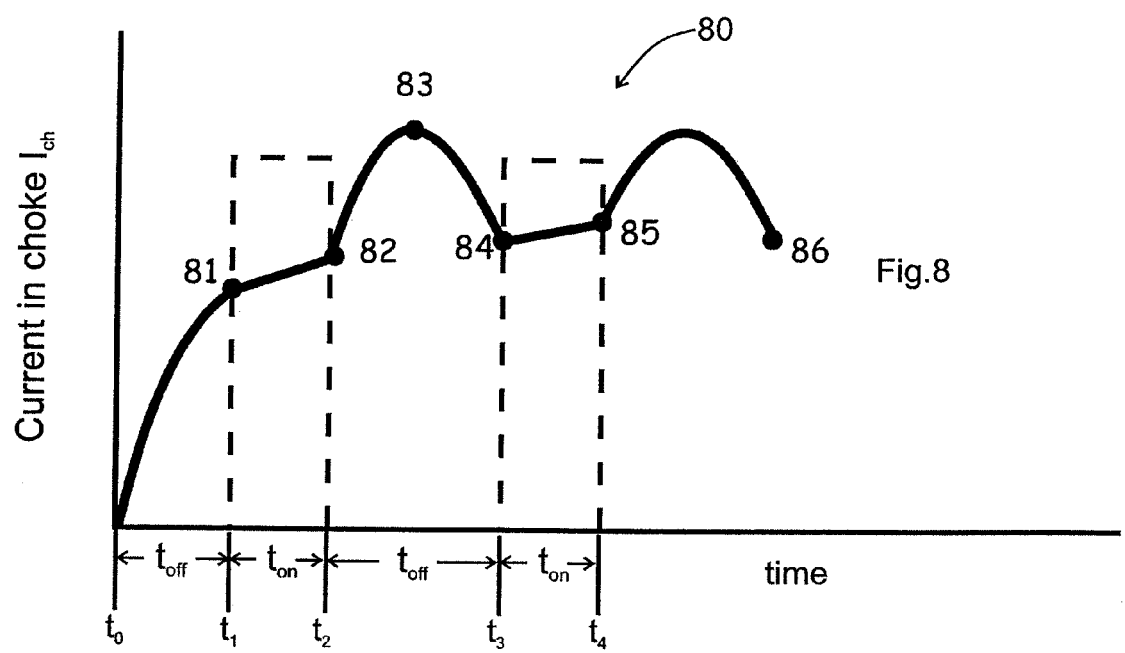
FIG. 8 is a schematic diagram of current in inductor 18 as a function of time, showing the alternating switching times $t_{on}$ and $t_{off}$ in one embodiment.

FIG. 8 illustrates the current amplitude 80 through inductor 18 over a number of charging cycles, for the previously described method of charging capacitor 22 to greater than 2 $U_D$, with non-zero initial conditions. During a first charging cycle ($t_0$ to $t_1$), the current gradually increases up to point 81 at time $t_1$ (start of on-time). Switch 30 is then closed and the charge stored in capacitor 22 (<2 $U_D$ on this initial cycle) is delivered to the load over the subsequent time period $t_{on}$ (from $t_1$ to $t_2$). After most or all of the energy has been delivered to the load, the switch 30 is opened at $t_2$, the start of the next charging cycle. During the second and subsequent charging cycles ($t_2$ to $t_3$), the current may increase to a level at point 83, but without exceeding the current limit of the inductor 18. It is desired to avoid current surges during each of these successive charging cycles. At the end of $t_{off}$ ($t_3$) the capacitor 22 is charged to greater than 2 $U_D$, which is then delivered to the load during the next $t_{on}$ ($t_3$ to $t_4$). Eventually (e.g., 10-20 cycles), an equilibrium is reached where the energy delivered to the load by inductor 18 and capacitor 22 is substantially constant from pulse to pulse.

Another consideration is the desire to open switch 30 after most (e.g., at least 50% in one embodiment, at least 90% in another embodiment) or all of the energy stored in charging capacitor 22 has been delivered to the load, e.g., when $I_L$ is low.

At the start of off-time, just before switch 30 is opened, the sum of currents flowing through switch 30, together with the resistance of the snubber circuit (31 in FIG. 3b), will determine the amplitude of any voltage spike (V=IR) across the switch 30. The amplitude of the voltage across the switch 30 is the product of the total current through the switch and the resistance of, for example, the snubber 31 provided in parallel to switch 30. At the time of opening switch 30 (start of off-time), the current through the switch 30 will include both $I_L$, the current flowing through the load circuit just prior to the opening of the switch 30, and $I_{ch}$, the current flowing through the charging circuit just prior to the opening of the switch 30. The current $I_{ch}$ may be determined from Equation 6.4:

$$I_{ch} = \frac{U_D}{1-B}\left(\frac{A}{R_{ch}} + \frac{At_{on}}{L_{ch}}\right) \tag{6.4}$$

where:

$U_D$ is the supply voltage across terminal pair 41-42;

$$\phi_{off} = \omega_{ch} t_{off} \tag{6.1}$$

$$A = \sin \phi_{off} \tag{6.2}$$

$$B = \cos \phi_{off} \tag{6.3}$$

$L_{ch}$ is determined from Equation 1.1;

$\omega_{ch}$ is determined from $f_{ch}$ Equation 1.0, where $\omega_{ch} = 2\pi f_{ch}$;

$t_{off}$ is determined from Equation 7.1; and $R_{ch}^0$ is the resonant resistance of the charging circuit which can be calculated using Equation 6.5:

$$R_{ch}^0 = \sqrt{\frac{L_{ch} + L_L}{C}} \tag{6.5}$$

where $L_{ch}$ is the inductance of the charging circuit, $L_L$ is the inductance of the load circuit, and C is the capacitance of the charging circuit.

The amplitude of any voltage spike through switch 30 at the opening time will be the product of the total current ($I_{ch}+I_L$) times the snubber resistance $R_S$, where Equation 4.2 can be used to determine the current through the load circuit $I_L$. The value of the total current should not exceed the maximum voltage limit of the switch 30. To achieve the lowest total current, it would thus generally be desirable to open the switch when $I_{ch}$ and $I_L$ are flowing in opposite directions through the switch and are of similar amplitude, so as to effectively cancel one another.

Operation for Maximum Power Delivery

The time rate of energy flow into the load 24 is the power delivered to the load. That power is the product of the voltage and current in load 24, as measured across the terminal pair 45-46 (see FIGS. 1 and 3). For maximum power delivery it is desired to provide the highest voltage across terminal pair 45-46; this however, will be limited by the voltage limit of switch 30. It is also desirable to provide the maximum current flow through the load 24; this will be limited by the maximum allowable current through the switch 30.

Utilizing the current max $I_{max}$ and voltage max $U_{max}$ of the switch 30, one can calculate an optimum on-time for maximum power delivery using Equation 7.0:

$$t_{on} = \frac{6L_L^{\frac{3}{2}}}{K_R}\sqrt{\frac{I_{max}}{U_{max}}} \tag{7.0}$$

where:

$$K_R = \pi \frac{D}{L}\sqrt{\rho\mu_0\mu} = \frac{R_{eq}}{\sqrt{\omega_L}}$$

The maximum off-time for switch 30 can be calculated using Equation 7.1:

$$t_{off} = \pi \frac{I_{max}}{U_{max}}\sqrt{L_{ch}L_L} \tag{7.1}$$

where $I_{max}$ and $U_{max}$ are the current and voltage limits of the switch 30 previously described, and $L_{ch}$ and $L_L$ are the inductances of the charging circuit 18 and load 26, respectively. It is generally desired to minimize the off-time (during which no energy is delivered to the load) by minimizing the amount of time required to charge capacitor 22 to a highest potential.

Operation within Current Limits of the Charging Circuit

Additional limitations of the power supply circuit may be identified and monitored, such as the current limit of the inductor 18 and the current limit of the rectifier 14. If the current limit of inductor 18 is exceeded, the core of the inductor will saturate and lose its inductance, and Equation 6.4 will no longer control the current in the charging circuit. A large current flowing through the switches 20 and 30 may then, upon the opening of switch 30, exceed the voltage limitation of the switch. A fuse may be provided in series with inductor 18 to prevent such a current surge.

Determining an Optimum Load Frequency

An optimum load frequency $\omega_{opt}$ can be determined using Equation 8.0:

$$\omega_{opt} = \frac{1}{L_L} \frac{U_{max}}{I_{max}} \quad (8.0)$$

The optimum load frequency thus depends upon the voltage maximum $U_{max}$ and current maximum $I_{max}$ of the switch 30, as well as the inductance of the load circuit $L_L$ (as determined by Equation 2.1).

Knowing the optimum load circuit frequency, one can select an appropriate charging capacitor 22 for attaining this frequency using Equation 8.1:

$$C = \frac{1}{L_L \omega_L^2} \quad (8.1)$$

where $\omega_{opt}$ is substituted for $\omega_L$.

Maintaining a High Power Factor

As previously described, the power delivered to the load is the product of the voltage (across the load) and current (through the load). When the voltage and current are at different phase angles, as illustrated in FIG. 7, the angle of the phaser $V_{rms}$ measured with $I_{rms}$ as the reference, is known as θ, the power factor angle, and cos θ as the power factor. It is routine to measure the average power $P_{av}$ with a power analyzer, the absolute value of $V_{rms}$ with a voltmeter, and the absolute value of $I_{rms}$ with an ammeter. From these three measurements, cos θ can be determined from Equation 9.1:

$$P_{av} = \frac{[V_m][I_m]}{2} \cos\theta = V_{rms} I_{rms} \cos\theta \quad (9.1)$$

It is desirable to maintain a high power factor in order to optimize the power delivery to the load. A reduction in the power factor during heating can be detected by monitoring the heating rate, or monitoring the time between zero crossings of the current and voltage in the load. The power factor angle can be modified by adjusting the values of one or more of C, L and R in the series load circuit of FIG. 3.

The power factor may be reduced if the current from the load is flowing backwards through the inductor 18. This can be prevented by placing a diode between inductor 18 and terminal 43 (see FIG. 1*a*).

Monitoring the Load Circuit

It may be desirable to monitor the load circuit to detect changes in the load parameters (e.g., permeability and resistivity). These changes may be detected by monitoring a response in the load, vis-à-vis the damping factor and/or the effective frequency of the current pulse signal (as determined by its various high frequency harmonic components). Alternatively, such monitoring can be used to modify an impedance parameter of the load and/or charging circuit (e.g., by use of a controllable rectifier or a variable capacitor) based on a desired power delivery to the load circuit.

Figure 9:
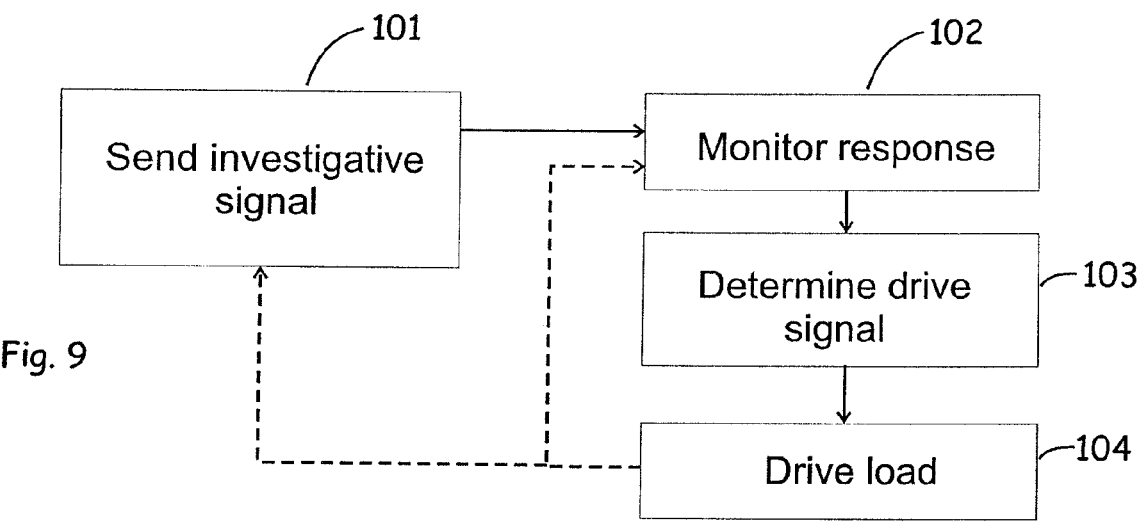
FIG. 9 is a block diagram of a method of determining a desired current pulse signal.
Figure 10:
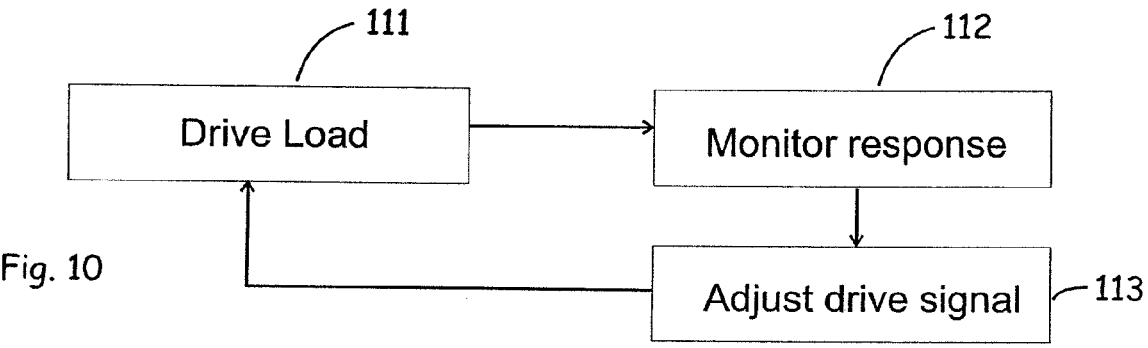
FIG. 10 is a block diagram of another method of determining a desired current pulse signal.

FIGS. 9-10 illustrate two alternative methods of monitoring the load circuit. In the method of FIG. 9, a low power investigative pulse is generated (101) to monitor the response of the load (102), and from that response a drive signal is determined to produce desired current pulses with high frequency harmonics (103), which drive signal is then used to power the load (104). The low power pulse can be generated in the circuit of FIG. 1 by a low input voltage, excessively long charging time (until capacitor 22 reaches $U_D$ equilibrium), or by a separate signal generation circuit.

In the alternative method of FIG. 10, the load is driven (111) by select current pulses with high frequency harmonics in the load and a response of the load is monitored (112) for changes. When changes occur, adjustments can be made in the drive signal (113) and the resulting current pulse signal, such as adjustments in on-time and/or off-time of the switch 30.

Changes in the load parameters can be monitored and measured by, for example, a wattmeter, voltmeter, ammeter or power analyzer. The output of such meters can be supplied to a feedback control system, for example, for controlling the opening and closing of the switch 30 (see e.g., the monitoring and control circuit 15 of FIG. 1). The feedback control system may include one or more of a processor, microcontroller, analog discrete components, PC-based software, embedded signal processors, and/or other methods of electronic feedback and control processing. A user interface may be provided for monitoring and/or inputting and/or outputting information.

The impedance parameters of the load circuit include resistance R, capacitance C and inductance L. The impedance is the vector sum of resistance R and reactance X, where the capacitive reactance is $1/(\omega C)$ and the inductive reactance is $\omega L$.

Figure 1B:
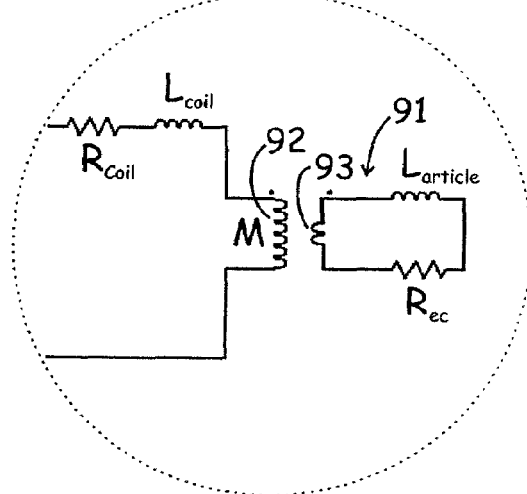

The impedance parameters of the load (for the embodiment of FIG. 1) are more specifically illustrated in FIG. 1*b*. These parameters include the heater coil resistance $R_{coil}$ and heater coil inductance $L_{coil}$. The article being heated is represented as a transformer having a primary coil 92 magnetically coupled to an eddy current circuit 91, the latter including a secondary coil 93, an eddy current resistance $R_{ec}$ and an inductance $L_{article}$.

The total resistance of the load circuit (28 in FIG. 1) includes the ohmic resistance of the heater coil ($R_{coil}$ in FIG. 1*b*) at the effective frequency (taking into account the skin effect) and the eddy current resistance ($R_{ec}$ in FIG. 1*b*) of the eddy current circuit of the load (91 in FIG. 1*b*).

The total capacitance of the load circuit is the capacitance of capacitor 22 and the capacitance between the heater coil and ground (not shown).

The total inductance of the load circuit (26 in FIG. 1) is the inductance of the heater coil ($L_{coil}$ in FIG. 1*b*), the leakage inductance of the load circuit (not shown), and the inductance of the eddy current circuit ($L_{article}$ in FIG. 1*b*).

The impedance parameters of the charging circuit are defined similar to those of the load circuit, but further include the reactance of the inductor 18 and of the rectifier/filter circuit 14/16.

The energy of a current pulse in the disclosed embodiment, wherein substantially all of the energy in capacitor 22 is delivered to each pulse, can be represented as $E_p = \frac{1}{2}C(2U_D)^2$.

More generally, the energy of a discrete pulse can be represented as the integral of the function $I^2 R$, taken over the time interval of the pulse ($t_{on}$):

$$E = \int_1^2 I^2 R \, dt$$

A Fourier transform of the current pulse can be used to determine the amount of pulse energy in the high-frequency harmonics, versus the fundamental frequency. A Fourier transform for periodic functions (the current pulses are periodic functions) leads to a Fourier series:

$$F(t) = A_o + A_1 \sin(\omega t) + A_2 \sin(2\omega t) + A_3 \sin(3\omega t) + \ldots$$

where
$\omega = 2\pi f$ = fundamental angular frequency,
$f = 1/T$ = fundamental frequency,
$t$ = time,
$T$ = period of this periodic function,
$A_o$ = constant, and
$A_1, A_2, A_3, \ldots$ = amplitudes of first, second, third, ... harmonics.

By high-frequency harmonics it is meant the harmonics at frequencies above (at a multiple of) the fundamental (first harmonic or root) frequency. The "root" frequency is the smallest time one can break a signal into and still have it be periodic. The high frequency harmonics are signals of frequency above the root frequency and together with the root frequency build the desired signal. Generally, it is desirable to generate large amplitudes within the harmonics so that the power delivered to the load is high. A current pulse signal with high frequency harmonics has been described as including both the fundamental (root) frequency, or first harmonic, and higher harmonics above the root frequency. The pulse signal may thus be understood as being constructed from such components.

A spectrum analyzer can also be used to analyze a periodic signal comprising a plurality of discrete current pulses with high-frequency harmonics. The spectrum of a current pulse signal with high frequency harmonics may be described as a sum of sine signals, starting with a root frequency w of amplitude $a_1$, and the high frequency harmonics above the root frequency of $2\omega$ and amplitude $a_2$, $3\omega$ and amplitude $a_3$, $4\omega$ and amplitude $a_4$, etc. Preferably, the amplitudes remain high as the frequency increases.

The load includes a heater coil that is magnetically coupled to an article being heated. Heater coil is used broadly to include any type of material or element that is electrically conductive (with varying levels of resistivity) for purposes of generating an alternating magnetic field when supplied with an alternating electric current. It is not limited to any particular form (e.g. wire, strand, coil, thick or thin film, pen or screen printing, thermal spray, chemical or physical vapor deposition, wafer or otherwise), nor to any particular shape. A nickel chromium (Nichrome) or copper heater coil may be used. Other heater coil materials include, for example, alloys of nickel, tungsten, chromium, aluminum, iron, copper, silver, etc.

The article being heated can be any object, substrate or material (i.e., liquid, solid or combination thereof), which is wholly or partly ferromagnetic or conductive and can be inductively heated by the application of a magnetic flux to induce eddy currents therein. Preferably, the article is fabricated from a magnetically permeable material such as iron, or other ferromagnetic material to facilitate magnetic coupling. The heat inductively generated in this article may subsequently be transferred to heat another object (whether or not ferromagnetic or conductive). There is no restriction on the geometry, dimensions and/or physical location of the article with respect to the heater coil.

Various methods and apparatus for inductive heating utilizing high-frequency harmonic current pulses are described in U.S. publication no. U.S. 2005/0006380 A1 published Jan. 13, 2005, "Heating Systems and Methods", Ser. No. 10/884,851, filed Jul. 2, 2004, by Valery Kagan, and U.S. publication no. U.S. 2005/0000959 A1 published Jan. 6, 2005, "Apparatus and Method for Inductive Heating", Ser. No. 10/612,272, filed Jul. 2, 2003, by Valery Kagan, both of which are hereby incorporated by reference in their entirety.

The desired current pulses can be generated by a variety of electronic devices which provide rapid switching to produce much of the pulse energy in high frequency harmonics. The use of multi-phase devices can further be used to boost the fundamental frequency of the pulses. Suitable IGBT devices are available from International Rectifier Corp., El Sugendo, Calif., such as the IRGKI140U06 device which provides hard switching at 25 KHz with a voltage over extended time of 600 volts and a current over extended time of 140 amps, or the IRGP450U, rated at 500 volts and 60 amps for hard switching at 10 KHz. Various signal generating or switching devices, including thyristors, gate-turn-off (GTO) thyristors, silicon controlled rectifiers (SCR), and integrated gate bipolar transistor (IGBT) devices, can be used as a pulse generator to provide the desired current pulses. Suitable thyristors are available from International Rectifier Corp. Integrated circuit chips with drivers are available for controlling the thyristors. Suitable GTOs are available from Dynex Semiconductor, Lincoln, UK.

If the input voltage is above the limit of the switch 30 during the charging cycle, one can substitute a controllable rectifier (e.g., phase fired) to modify the voltage across 41-42 in FIG. 1.

The heater coil can be made from a solid conductor such as copper, or from a more highly resistive material such as nickel chromium. The coil is covered by electrically insulating material (e.g., layer or coating such as magnesium oxide or alumina oxide). The coil may be in close physical contact with the article being heated, or there may be an air gap between the coil and article. There may also optionally be a thermally conductive material, or thermally insulating material, between the coil and article.

The heater coil may be coiled in a serpentine pattern disposed on or adjacent a surface of the article and provide a magnetic field in alternating directions (with respect to position) across the article. The heater coil may be formed in a cylindrical pattern wrapped around a three dimensional article and provide a magnetic field in the same direction (with respect to position) inside the coil. In various embodiments, the electrical conductor can be a hollow element or a solid element and it can take various shapes and forms, such as spiral, serpentine, loop, spiral or loop serpentine. The conductive coil can have a variable pitch (distance between turns) which will effect the resulting magnetic field generation. Depending on available space and desired heating power, the shape and distance between coils can be varied to vary the heating power density. A description of basic heater coil designs is found in S. Zinn and S. L. Semiaten, "Coil Design and Fabrication" a three part article published in *Heat Treating*, June, August and October 1988.

The heating output of the coil is a function of the frequency, current and number of turns of the heating element. This correlation can be described as:

$$I^2 N^2 \sqrt{\omega} = \alpha P_{req}$$

where $\alpha$ is a function of the material and geometry
I = current
N = number of turns
$\Omega$ = frequency of power source
$P_{req}$ = power required to heat material Equation (10.1) can be used to calculate the expected resistance to the flow of eddy currents ($R_e$) in a ferromagnetic material forming a cylinder; equation (10.2) is a comparable equation for a flat plate. Here it is assumed that the cylinder or plate is part of a closed magnetic loop, and the current is applied to a heater coil wrapped around the cylinder, or surface mounted in snake (serpentine) shape on the flat plate. For the cylinder, the equivalent resistance to the flow of eddy currents ($R_e$) is:

$$R_e = \frac{\pi D}{L} \sqrt{\rho \mu \omega} \qquad (10.1)$$

where
D is the diameter of the cylinder,
L is the length of the cylinder,
$\rho$ is the resistivity of the cylinder material,
$\mu$ is the permeability of the cylinder material, and
$\omega$ is the angular frequency of the eddy currents in the cylinder, and for a plate:

$$R_e = \frac{L}{p} \sqrt{\rho \mu \omega} \qquad (10.2)$$

where
L is the length of the coil conductor,
p is the perimeter of the coil conductor,
$\rho$ is the resistivity of the flat plate material,
$\mu$ is the permeability of the flat plate material, and
$\omega$ is the angular frequency of the eddy currents in the plate, and in both cases (cylinder and plate) where $\omega=2\pi f$ is the fundamental frequency, and f=1/T for a period T.

In various embodiments of the invention, $t_{on}$ and $t_{off}$ are determined to enable delivery in the current pulses of at least a certain percentage of the energy stored in the charging circuit, where that minimum percentage may be at least 50%, at least 75%, or at least 90%.

Various embodiments of the method and apparatus of the present invention also provide at least a certain percentage of the pulse energy in high frequency harmonics. That percentage may be a minimum of at least 50%, at least 75%, or at least 90%.

Still further, in various embodiments the width ($t_{on}$) of the pulse is determined by the pulse amplitude diminishing by a certain percentage of the amplitude of a maximum peak in the pulse. That percentage decrease may be at least 50%, at least 75%, at least 90%, or at least 95%. The pulse width may be selected to provide two or three oscillations per pulse before the switch is opened. In one embodiment, where the load circuit has a damping ratio from 0.05 to 0.1, a pulse width of 3 or 2 oscillations per pulse, respectively, is provided.

Each current pulse comprises at least one and preferably a plurality of steeply rising and falling portions. These portions may comprise a steeply rising lead portion, a steeply falling trailing portion, and (optionally) additional steeply rising and/or falling portions between the leading and trailing portions. In various embodiments, a desired pulse shape may be a compromise between the phase shift (between voltage and current) and the frequency (a low phase shift and high frequency being desirable) leading to an oscillating pulse that has two complete cycles before damping to an amplitude below 10% of an amplitude of a maximum peak in the pulse.

In one example, an amplitude of a maximum (usually first) peak in the current pulse may be greater than 100 amperes, and the pulse amplitude diminishes to less than 8% of the initial peak amplitude. However, in other embodiments, it may be beneficial to end the pulse (open the switch) when the pulse amplitude is less than 50%, for example if the damping coefficient is low. In this latter example, the current level in the switch would be considerably higher than in the prior example.

In another embodiment, the on/off is controlled such that each current pulse includes at least one steeply varying portion having a maximum rate of change of at least 5 times greater than a maximum rate of change of a sinusoidal signal of the same fundamental frequency and RMS current amplitude. In select embodiments, the maximum rate of change may be at least 10 times greater, or at least 20 times greater. The upper limit of the maximum rate of change may be determined based on a voltage limit of the load circuit. The on/off timing may also be controlled such that each current pulse contains at least two complete oscillation cycles before damping to a level below 10% of a maximum peak in the current pulse.

Based upon the present disclosure, the skilled person can control the shape of the individual current pulses and the on/off timing of the current pulses in order to deliver a desired current signal to a heating element. In general, the energy delivered to the heating element is dependent on both the frequency of the pulses (number of pulses per unit time) and the shape of the pulses (the amount of energy provided in high frequency harmonics). Thus, if more energy is required to be delivered to the heating element, then the frequency of the pulses can be increased and/or the shape of the individual pulses can be modified to provide more high frequency harmonics. Furthermore, if a higher input voltage is provided, then the pulse frequency can be reduced and/or the shape of the pulses can be modified so as to reduce the amount of high frequency harmonics.

Thus, those of ordinary skill in the art will appreciate that the preceding description of certain preferred embodiments is provided in terms of description, and not limitation. Modifications and substitutions can be made without departing from the scope of the invention as subsequently claimed.

The invention claimed is:

1. A power supply control apparatus comprising:
  a charging circuit;
  a load circuit coupled to the charging circuit;
  a switching device for controlling the charging circuit to deliver current pulses in the load circuit during an on-time of the switching device; and
  a monitoring and control circuit for controlling the on-time and off-time of the switching device during a heating cycle to provide a desired amount of pulse energy in high frequency harmonics in the load circuit.

2. The apparatus of claim 1, wherein the monitoring and control circuit controls an opening time of the switching device by monitoring current in the charging and load circuits.

3. The apparatus of claim 1, wherein the desired amount is at least 50%.

4. The apparatus of claim 1, wherein the switching device couples the charging circuit and load circuit so that at least 50% of the energy stored in the charging circuit is delivered to the load circuit.

5. The apparatus of claim 4, wherein the switching device couples the charging circuit and load circuit so that at least 90% of the energy stored in the charging circuit is delivered to the load circuit.

6. The apparatus of claim 1, wherein the switching device couples the charging circuit to the load circuit so that for an input voltage $U_D$ to the charging circuit, a voltage of at least $2U_D$ is delivered to the load circuit.

7. The apparatus of claim 1, wherein the switching device couples the charging circuit to the load circuit such that current oscillates through the switching device during the delivery of the current pulses to the load circuit.

8. The apparatus of claim 1, wherein the switching device couples the charging circuit to the load circuit such that energy is left stored in the charging circuit to achieve a non-zero current condition in the load circuit on subsequent charging cycles.

9. The apparatus of claim 6, wherein the on-time and/or off-time is controlled to achieve a substantially zero current condition through the switch, while neither the load circuit nor the charging circuit have a zero current condition.

10. The apparatus of claim 1, wherein the monitoring circuit includes means for monitoring consecutive zero crossings of the current or voltage in the current pulse and determining a desired shape and frequency of the current pulse based on such monitoring.

11. The apparatus of claim 1, wherein the load circuit has a damping ratio in a range of 0.01 to 0.2.

12. The apparatus of claim 11, wherein the load circuit has a damping ratio in a range of 0.05 to 0.1.

13. The apparatus of claim 1, including a signal generator to provide a signal for determining at least one impedance parameter of the load circuit.

14. The apparatus of claim 1, including means for monitoring the response of the load circuit for changes to at least one impedance parameter of the load circuit.

15. The apparatus of claim 1, wherein the load circuit includes a heater coil magnetically coupled to a ferromagnetic or conductive article.

16. The apparatus of claim 1, including means for monitoring zero crossings of voltage or current supplied to the load circuit.

17. The apparatus of claim 1, including a means for monitoring the amplitude of consecutive peaks of a voltage or current supplied to the load circuit.

18. The apparatus of claim 1, wherein the switching device comprises a plurality of switches disposed in parallel.

19. The apparatus of claim 1, including means for preventing current in the load circuit from flowing back through the charging circuit.

* * * * *